(12) United States Patent
Kitanaka et al.

(10) Patent No.: US 8,598,837 B2
(45) Date of Patent: Dec. 3, 2013

(54) DRIVING CONTROLLER FOR AC MOTOR

(75) Inventors: Hidetoshi Kitanaka, Chiyoda-ku (JP);
Hideo Okayama, Chiyoda-ku (JP);
Shinichi Furutani, Chiyoda-ku (JP);
Toshie Takeuchi, Chiyoda-ku (JP);
Mitsuru Tsukima, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 556 days.

(21) Appl. No.: 12/863,780

(22) PCT Filed: Feb. 29, 2008

(86) PCT No.: PCT/JP2008/053650
§ 371 (c)(1),
(2), (4) Date: Jul. 21, 2010

(87) PCT Pub. No.: WO2009/107233
PCT Pub. Date: Sep. 3, 2009

(65) Prior Publication Data
US 2010/0289439 A1 Nov. 18, 2010

(51) Int. Cl.
*H02P 27/04* (2006.01)
(52) U.S. Cl.
USPC .................. 318/801; 318/400.21; 318/400.22
(58) Field of Classification Search
USPC .................. 318/801, 400.21, 400.22
See application file for complete search history.

(56) References Cited

U.S. PATENT DOCUMENTS

| 4,563,624 | A | * | 1/1986 | Yu ................................. | 318/472 |
| 5,196,656 | A | * | 3/1993 | Mizuno et al. ................ | 187/314 |
| 5,677,604 | A | * | 10/1997 | Masaki et al. ................ | 318/139 |
| 7,837,004 | B2 | * | 11/2010 | Yasuda .......................... | 180/446 |
| 8,228,008 | B2 | * | 7/2012 | Kitanaka ........................ | 318/45 |

FOREIGN PATENT DOCUMENTS

| DE | 3929236 A1 | 2/1991 |
| EP | 1 131 873 B1 | 5/2007 |

(Continued)

OTHER PUBLICATIONS

Notice of Allowance (Decision on Grant) from Russian Patent Office issued in corresponding Russian Patent Application No. 2010139885 dated Oct. 28, 2011 with an English translation thereof.

(Continued)

*Primary Examiner* — Erick Glass
(74) *Attorney, Agent, or Firm* — Buchanan Ingersoll & Rooney PC

(57) ABSTRACT

An object is to provide a driving controller for an AC motor that can prevent generation of an excessive voltage between lines of a motor and between contacts of a motor cut-off contactor and a continuous arc between contacts of the motor cut-off contactor, regardless of the type of a fault occurred, even when a phase in which a current zero point is not generated and a phase in which a current zero point is generated coexist in a fault current that flows between an inverter and the motor. A control unit is configured to open a motor cut-off contactor not at a time when a state of a detected current is determined to be abnormal but at a time when the state of the current is determined to be normal, even when a basic contactor-close command MKC0 becomes off (L level).

20 Claims, 7 Drawing Sheets

(56) References Cited

FOREIGN PATENT DOCUMENTS

| | | |
|---|---|---|
| JP | 62-76117 A | 4/1987 |
| JP | 4-71130 A | 3/1992 |
| JP | 5-190049 A | 7/1993 |
| JP | 8-182105 A | 7/1996 |
| JP | 09-247805 A | 9/1997 |
| JP | 2005-117797 A | 4/2005 |
| JP | 2005-312255 A | 11/2005 |
| RU | 1786589 A1 | 1/1993 |
| RU | 1792214 A1 | 11/1995 |
| RU | 2 054 223 C1 | 2/1996 |
| RU | 2 219 650 C2 | 12/2003 |

OTHER PUBLICATIONS

Office Action (Decision of a Patent Grant) dated Jul. 30, 2012, issued in corresponding Korean Patent Application No. 10-2010-7019032. (2 pages).
International Search Report for PCT/JP2008/053650 completed Apr. 3, 2008.
Written Opinion for PCT/JP2008/053650 completed Apr. 3, 2008.
Office Action issued on Mar. 22, 2013 in corresponding Canadian Patent Application No. 2,714,709.
Extended European Search Report issued on Oct. 2, 2013 in corresponding European Patent Application No. 08721070.4-1806/ 2256892 (6 pgs.).

* cited by examiner

DRIVING CONTROLLER FOR AC MOTOR

TECHNICAL FIELD

The present invention relates to a driving controller for an AC motor suitable for driving a permanent magnet synchronous motor incorporated in an electric vehicle.

BACKGROUND ART

Permanent magnet synchronous motor (hereinafter, simply "motor", unless otherwise requires particular distinctions) has been known to be a highly efficient motor. As compared to induction motors conventionally used in various fields, the permanent magnet synchronous motor does not require any excitation current because a magnetic flux is established by a permanent magnet incorporated in a rotor, and secondary copper loss does not occur because any current does not flow in the rotor unlike induction motors. While electric vehicles have conventionally used induction motors, application of the permanent magnet synchronous motor to them has been studied in recent years to achieve efficiency improvements.

In electric vehicles, a driving controller for an AC motor and a motor are incorporated in each of plural combined vehicles. Even when a short-circuit fault occurs in a driving controller for an AC motor in a certain vehicle while the vehicle is running, the electric vehicle can continue to run by other driving controllers for AC motors and motors that are normally operating. The motor connected to the defective driving controller for an AC motor continues to be driven by wheels. Consequently, a short-circuit current caused by an induced voltage of the motor continues to flow in a part of the driving controller for an AC motor where the short-circuit fault has occurred (a short-circuited part).

When such a state is left as it is, the defective part of the driving controller for an AC motor can be further extended by heat generated by the short-circuit current, and the defective part or the motor can generate heat or burnout, which is not preferable.

To deal with such cases, for example, Patent Document 1 discloses a method in which a motor cut-off contactor provided to serve as a motor side switch electrically disconnects an inverter from a motor. A control unit controls the contactor to open for electrically disconnecting the inverter from the motor when a fault in the inverter is detected. Thus, the inverter is not further damaged when the fault occurs in the inverter within a driving controller for an AC motor controlling to drive a permanent magnet synchronous motor while an electric vehicle is running.

Patent Document 1: Japanese Patent Application Laid-open No. H8-182105

As generally known, because a current zero point is generated in an alternating current with a sinusoidal waveform for every half period of a current waveform, the current can be interrupted utilizing the current zero point. The motor cut-off contactor disclosed in Patent Document 1 mentioned above is a contactor that interrupts an alternating current utilizing the current zero point to interrupt the current. Examples of the contactor that interrupts an alternating current generally include a vacuum contactor, to which a system of interrupting a current at current zero points is applied.

DISCLOSURE OF INVENTION

Problem to be Solved by the Invention

The present inventors have found that a phase in which a current zero point is not generated and a phase in which a current zero point is generated sometimes coexist in a fault current depending on the type of a fault occurred in the driving controller for an AC motor. The fault current is a current that flows between an inverter within a driving controller for an AC motor and a motor. When the above motor cut-off contactor utilizing the system of interrupting a current at current zero points interrupts the fault current, the current of the phase in which a current zero point exists is interrupted; however, the current cannot be interrupted in other phases not having current zero points and thus the inverter remains electrically connected to the motor by an arc being continuously generated.

In such a defective state, the motor is put in an unbalanced state because only the phase in which the current is interrupted among three phases is disconnected from the inverter. Therefore, an excessive voltage is generated between lines of the motor and between contacts of the motor cut-off contactor. This excessive voltage can lead to breaking down of insulation of coils in the motor, the motor cut-off contactor, and cables connecting the motor cut-off contactor to the motor. Further, because an arc continues to be generated between the contacts of the motor cut-off contactor, the motor cut-off contactor can be damaged.

The present invention has been made in view of the above problems and an object of the invention is to provide a driving controller for an AC motor. The driving controller is configured such that, even when a phase in which a current zero point is not generated and a phase in which a current zero point is generated coexist in a fault current flowing between an inverter and a motor, generation of an excessive voltage between lines of the motor and between contacts of a motor cut-off contactor can be prevented, and generation of a continuous arc between the contacts of the motor cut-off contactor can be prevented, regardless of the type of a fault occurred.

Means for Solving Problem

An aspect of the present invention is a driving controller for an AC motor including: an inverter that includes a plurality of on-off controlled switching elements and converts a DC voltage into an AC voltage with an arbitrary frequency to drive an AC motor; a motor side switch connected between the inverter and the AC motor; an electric-quantity detector that detects an electric quantity at an output side of the inverter; and a control unit that on-off controls the switching elements in the inverter and controls the motor side switch to open and close based on at least a current detected by the electric-quantity detector, wherein the control unit includes: a current-state determining unit that generates a determination signal having determined whether a current detected by the electric-quantity detector is in an abnormal state, and a contactor control unit that controls based on the determination signal a timing of actually outputting an upper instruction, which has been generated for opening the motor side switch, to the motor side switch.

Effect of the Invention

According to the present invention, even when a phase in which a current zero point is not generated and a phase in which a current zero point is generated coexist in a fault current flowing between an inverter and a motor, generation of an excessive voltage between lines of the motor and between contacts of a motor cut-off contactor can be prevented and generation of a continuous arc between the contacts of the motor cut-off contactor can be prevented, regardless of the type of a fault occurred. Therefore, it is possible to obtain a driving controller for an AC motor in which insulation of coils in a motor, a motor cut-off contactor, and cables connecting the motor cut-off contactor to the motor is not broken down and the motor cut-off contactor is not damaged by an arc generated between contacts of the motor cut-off contactor, regardless of the type of a fault occurred.

BRIEF DESCRIPTION OF DRAWINGS

FIG. 4 shows a situation where a fault has occurred and a phase in which a current zero point is not generated and a phase in which a current zero point is generated coexist in a fault current and when the phase in which a current zero point is generated is interrupted.

EXPLANATIONS OF LETTERS OR NUMERALS

Figure 1:
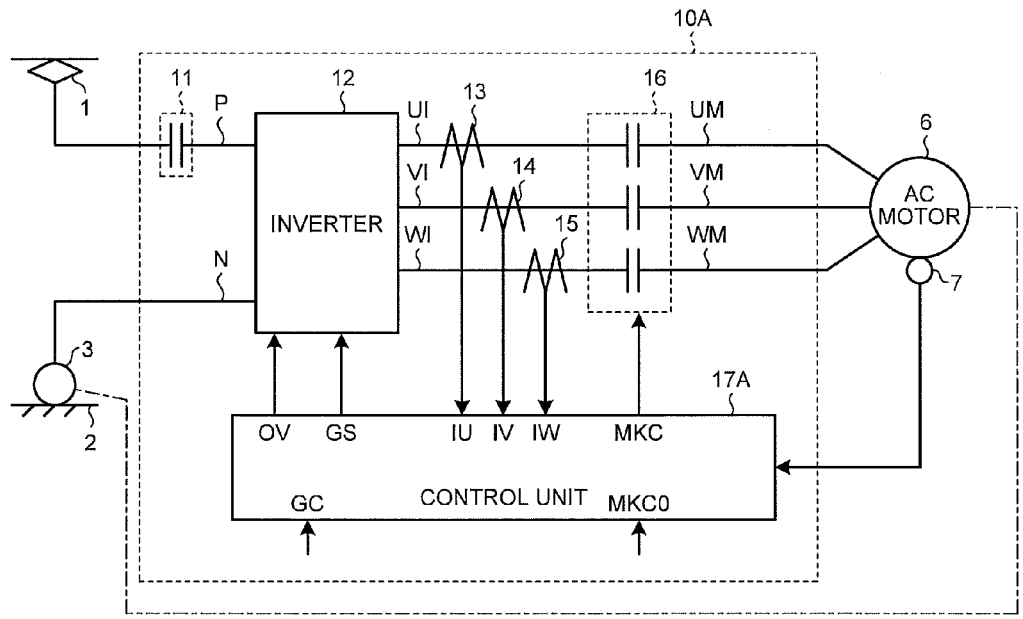
FIG. 1 is a block diagram of a configuration example of a driving controller for an AC motor according to a first embodiment of the present invention.

1 Current collector
2 Rail
3 Wheel
6 AC motor
7 Rotation detector
10A, 10B Driving controller of AC motor
11 Power-supply cut-off contactor
12 Inverter
13, 14, 15 Current detector
16 Motor cut-off contactor
17A, 17B Control unit
18 Discharging circuit
19 Filter capacitor
20 Current-state determining unit
21 Current-zero-point-state detecting unit
21a Current-zero-point detecting unit
21b Oscillating unit
21c Counter unit
21d Comparator
22 Current-peak-value-state detecting unit
22a Current-peak-value detecting unit
22b Comparator
23 Current-effective-value-state detecting unit
23a Current-effective-value detecting unit
23b Comparator
25U U-phase-detection logic unit
25V V-phase-detection logic unit
25W W-phase-detection logic unit
27 Determining unit
30 Gate-signal logic unit
31 Latch circuit
32 NOT circuit (NOT)
33 AND circuit (AND)
40A, 40B Contactor control unit
41, 42 NOT circuit (NOT)
43 Time delayelement circuit (ONTD)
44 AND circuit (AND)
45 OR circuit (OR)
46 Latch circuit
47 One-shot circuit
P Positive side conductor
N Negative side conductor
UI Inverter-side U-phase conductor
VI Inverter-side V-phase conductor
WI Inverter-side W-phase conductor
UM Motor-side U-phase conductor
VM Motor-side V-phase conductor
WM Motor-side W-phase conductor
UP U-phase upper-arm element
VP V-phase upper-arm element
WP W-phase upper-arm element
UN U-phase lower-arm element
VN V-phase lower-arm element
WN W-phase lower-arm element

BEST MODE(S) FOR CARRYING OUT THE INVENTION

Exemplary embodiments of a driving controller for an AC motor according to the present invention will be explained below in detail with reference to the accompanying drawings.

First Embodiment

FIG. 1 is a block diagram of a configuration example of a driving controller for an AC motor according to a first embodiment of the present invention. With reference to FIG. 1, reference numeral 1 denotes a current collector contacting overhead electric wires to receive power in an electric vehicle. Reference numeral 2 denotes a rail, reference numeral 3 denotes a wheel of the electric vehicle, and reference numeral 6 denotes an AC motor. The AC motor 6 is incorporated in a vehicle together with a driving controller 10A for an AC motor according to the first embodiment and its rotating shaft is mechanically linked to the wheel 3. The AC motor 6 is provided with a rotation detector 7.

The driving controller 10A for an AC motor shown in FIG. 1 includes, as basic components of the present invention, a power-supply cut-off contactor 11, an inverter 12, current detectors 13, 14, and 15, a motor cut-off contactor 16, and a control unit 17A.

One end of the power-supply cut-off contactor 11 is connected to an output terminal of the current collector 1 and the other end thereof is connected through a positive side conductor P to a positive-side input terminal of the inverter 12. That is, the power-supply cut-off contactor 11 is a power-supply side switch capable of disconnecting a DC input side of the inverter 12 from the current collector 1 serving as a power supply.

A negative-side input terminal of the inverter 12 is connected through a negative side conductor N to the wheel 3.

Such a configuration enables DC power to be inputted from the current collector 1 through the power-supply cut-off contactor 11 and from the rail 2 through the wheel 3 to the inverter 12. The inverter 12 converts the DC power inputted by the positive side conductor P and the negative side conductor N into AC power by a configuration shown in FIG. 2, for example.

Figure 2:
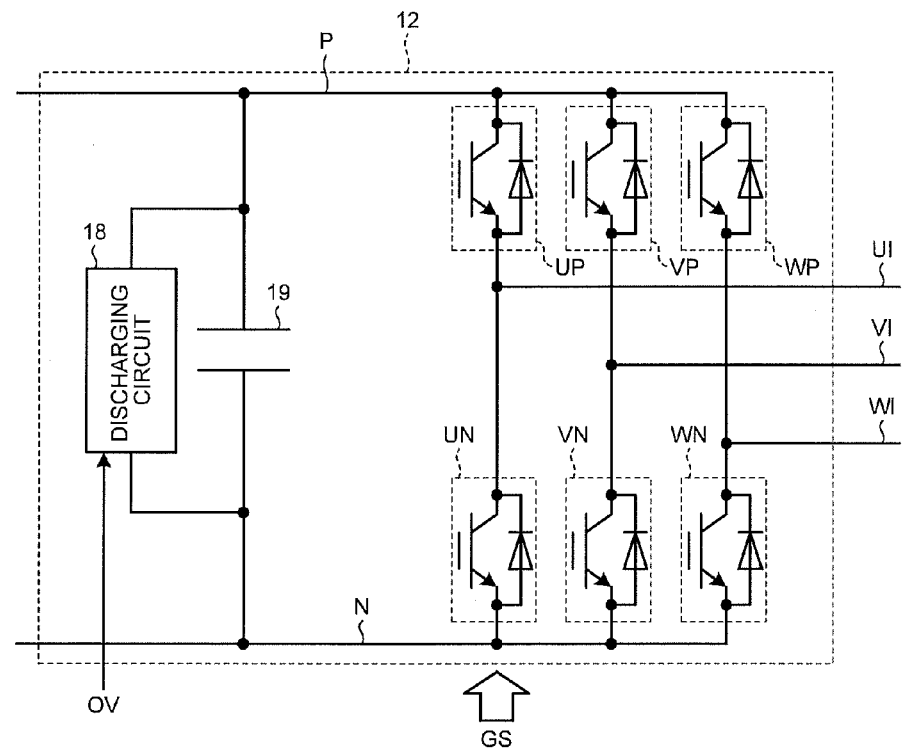
FIG. 2 is a circuit diagram of a configuration example of an inverter shown in FIG. 1.

FIG. 2 is a circuit diagram of a configuration example of the inverter 12 shown in FIG. 1. As shown in FIG. 2, the inverter 12 is configured such that a so-called three-phase two-level inverter circuit is provided between the positive side conductor P and the negative side conductor N. A discharging circuit 18 and a filter capacitor 19 are provided in parallel between the positive side conductor P and the negative side conductor N.

The three-phase two-level inverter circuit is a bridge circuit of three positive-side-arm switching elements (a U-phase upper-arm element UP, a V-phase upper-arm element VP, and a W-phase upper-arm element WP) connected to the positive side conductor P and three negative-side-arm switching elements (a U-phase lower-arm element UN, a V-phase lower-arm element VN, a W-phase lower-arm element WN) connected to the negative side conductor N. A diode is connected in anti-parallel to each switching element. Connection points of the upper arm elements and the lower arm elements in the respective phases form three-phase output terminals and these output terminals are connected to an inverter-side U-phase conductor UI, an inverter-side V-phase conductor VI, and an inverter-side W-phase conductor WI, respectively. Although a well-known IGBT is shown for the switching element in FIG. 2, switching elements other than IGBT can be used. While the three-phase two-level inverter circuit is shown in FIG. 2, a multi-level inverter circuit such as a three-level inverter circuit can be used.

Although omitted in FIG. 2, the inverter 12 is provided with a drive circuit for receiving a gate signal GS outputted from the control unit 17A to the inverter 12 in FIG. 1. This drive circuit has a function of on-off controlling the six switching elements individually according to the gate signal GS.

As shown in FIG. 1, the three-phase output terminals of the inverter 12 are connected to the motor cut-off contactor 16 through the inverter-side U-phase conductor UI, the inverter-side V-phase conductor VI, and the inverter-side W-phase conductor WI. The motor cut-off contactor 16 is connected to the AC motor 6 through a motor-side U-phase conductor UM, a motor-side V-phase conductor VM, and a motor-side W-phase conductor WM.

According to the inverter 12 with the configuration described above, the respective switching elements in the inverter circuit are switched on or off according to the gate signal GS inputted by the control unit 17A. Thus, an inputted DC voltage is converted into a three-phase AC voltage with an arbitrary frequency and the AC motor 6 is driven through the motor cut-off contactor 16. The AC motor 6 then rotates the mechanically linked wheel 3 to run the electric vehicle on the rail 2.

A terminal voltage of the filter capacitor 19 is substantially equal to a voltage received from the current collector 1 (an overhead electric-wire voltage) and it is about DC600 volts to DC3000 volts in normal electric vehicles.

Although its detailed internal configurations are not shown, the discharging circuit 18 is configured by a serial circuit formed of a resistor and a switch (including a semiconductor switch) and a circuit for discharging electric charges in the filter capacitor 19 based on a discharge command OV. The discharge command OV is inputted from the control unit 17A or a higher-level device (not shown) in a predetermined case such as when any abnormality occurs in the driving controller 10A for an AC motor. Although not shown, when the discharging circuit 18 performs a discharge operation, the power-supply cut-off contactor 11 is controlled to be opened at the same time by the control unit 17A or the higher-level device (not shown).

Referring back to FIG. 1, the current detectors 13, 14, and 15 are provided respectively at the inverter-side U-phase conductor UI, the inverter-side V-phase conductor VI, and the inverter-side W-phase conductor WI that connect between the three-phase output terminals of the inverter 12 and the motor cut-off contactor 16. A U-phase current IU, a V-phase current IV, and a W-phase current IW detected by the current detectors 13, 14, and 15, respectively are inputted to the control unit 17A. While the current detectors are configured to detect the respective three-phase output currents of the inverter 12 in FIG. 1, an arbitrary two-phase current can be detected. A current in the phase that the current detector is not provided can be calculated.

The motor cut-off contactor 16 is a motor side switch capable of disconnecting the three-phase output terminals of the inverter 12 from the AC motor 6 according to an instruction from the control unit 17A (a contactor close command MKC). The motor cut-off contactor 16 is formed by a contactor capable of interrupting an alternating current. Because a current zero point is generated in the alternating current for every half period of its current waveform, the contactor, which is capable of interrupting an alternating current, usually interrupts a current utilizing the current zero point.

The motor cut-off contactor 16 is configured such that when the contactor close command MKC from the control unit 17A becomes on, a closing coil is excited, main contacts mechanically connected to the closing coil is closed to close the three phases, and thus the inverter 12 is electrically connected to the AC motor 6. Further, the motor cut-off contactor 16 is configured such that when the contactor close command MKC from the control unit 17A becomes off, the excitation of the closing coil stops, the main contact is opened to open the respective three phases, and thus the inverter 12 is electrically disconnected from the AC motor 6.

The motor cut-off contactor 16 can be configured to drive main contacts of the three phases by single closing coil or can be configured to provide closing coils for the respective main contacts of the three phases. In the latter configuration, the timing of closing and opening can be set individually in the respective phases.

A rotation state of the AC motor 6 is detected by the rotation detector 7 and is inputted to the control unit 17A. A so-called sensorless control system for controlling the AC motor 6 without the rotation detector 7 is practically used. When the sensorless control system is adopted, the rotation detector 7 is unnecessary. In the case of the sensorless control system, a voltage detector (not shown) can be provided at an input stage (the inverter-side U-phase conductor UI to the W-phase conductor WI) or an output stage (the motor-side U-phase conductor UM to the W-phase conductor WM) of the motor cut-off contactor 16 to detect an output voltage of the inverter 12 or a terminal voltage of the AC motor 6, and the voltage detector inputs the detection result to the control unit 17A.

In the present embodiment, as described above, it is assumed that the AC motor 6 is a permanent magnet synchronous motor. Incidentally, there is a motor in which a permanent magnet is buried in a rotor for an induction motor. The present invention can be applied to, in addition to the permanent magnet synchronous motor, such motors in which a permanent magnet is incorporated in a rotor.

As described above, the present inventors have found that the phase in which a current zero point is not generated and the phase in which a current zero point is generated coexist in a fault current, which flows between the inverter 12 within the driving controller 10A for an AC motor and the AC motor 6, depending on the type of a fault occurred in the driving controller for an AC motor.

The control unit 17A is configured such that generation of an excessive voltage between lines of the AC motor 6 and between contacts of the motor cut-off contactor 16 is prevented and generation of a continuous arc between the contacts of the motor cut-off contactor 16 is prevented, based on the three-phase currents IU, IV, and IW detected by the current detectors 13, 14, and 15, the gate signal GS and the discharge command OV that are applied to the inverter 12, and a basic gate signal GC and a basic contactor-close command MKC0 from an external higher-level device (not shown). Thus, the motor cut-off contactor 16 that interrupts an alternating current can be opened reliably in three phases even in the case where a fault current flows and the phase in which a current zero point is not generated and the phase in which a current zero point is generated coexist.

Figure 3:
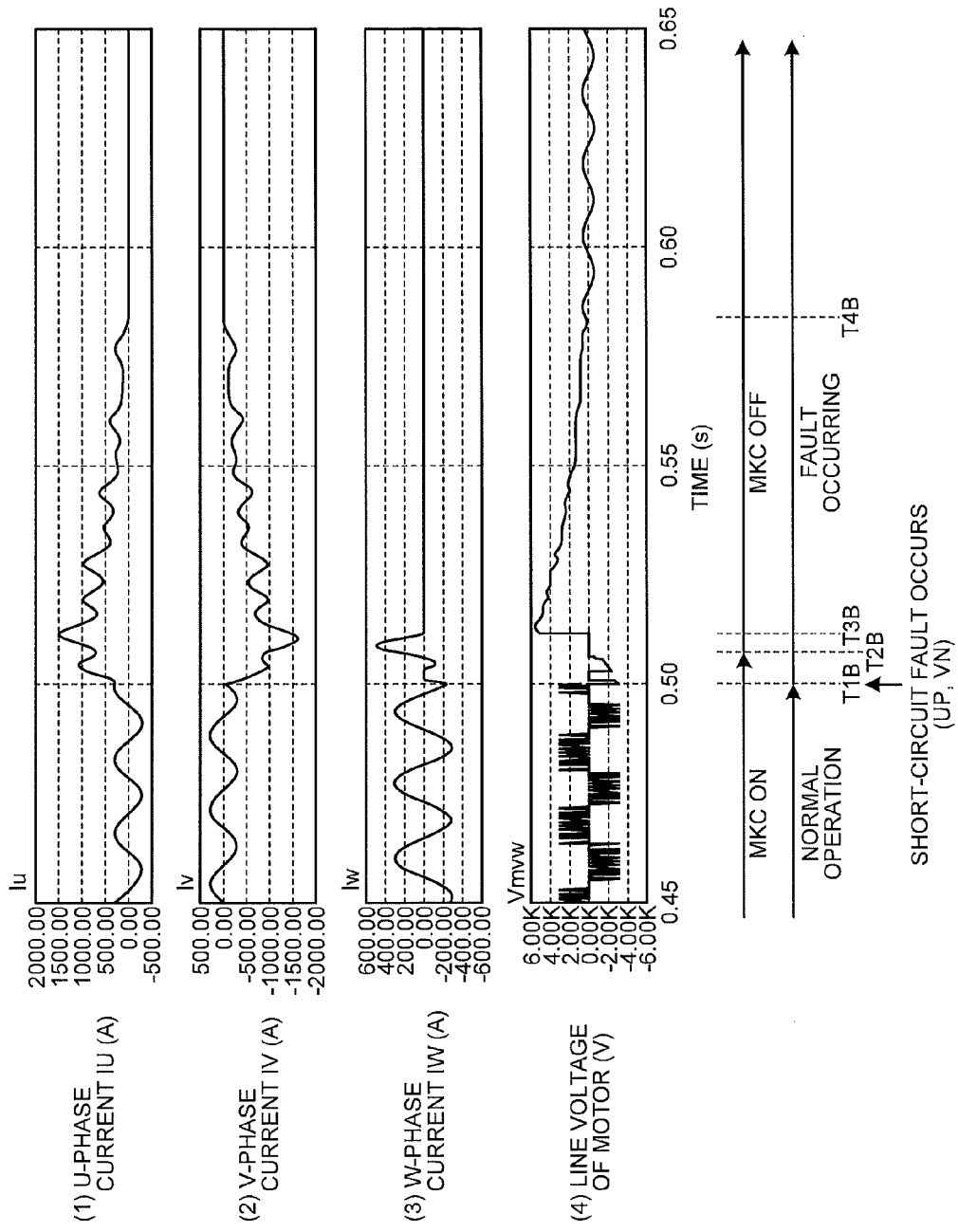
FIG. 3 is a waveform diagram of an exemplary fault that occurs when a phase in which a current zero point is not generated and a phase in which a current zero point is generated coexist in a fault current, current waveforms at the time of the fault, and a waveform of a line voltage of a motor.
Figure 4:
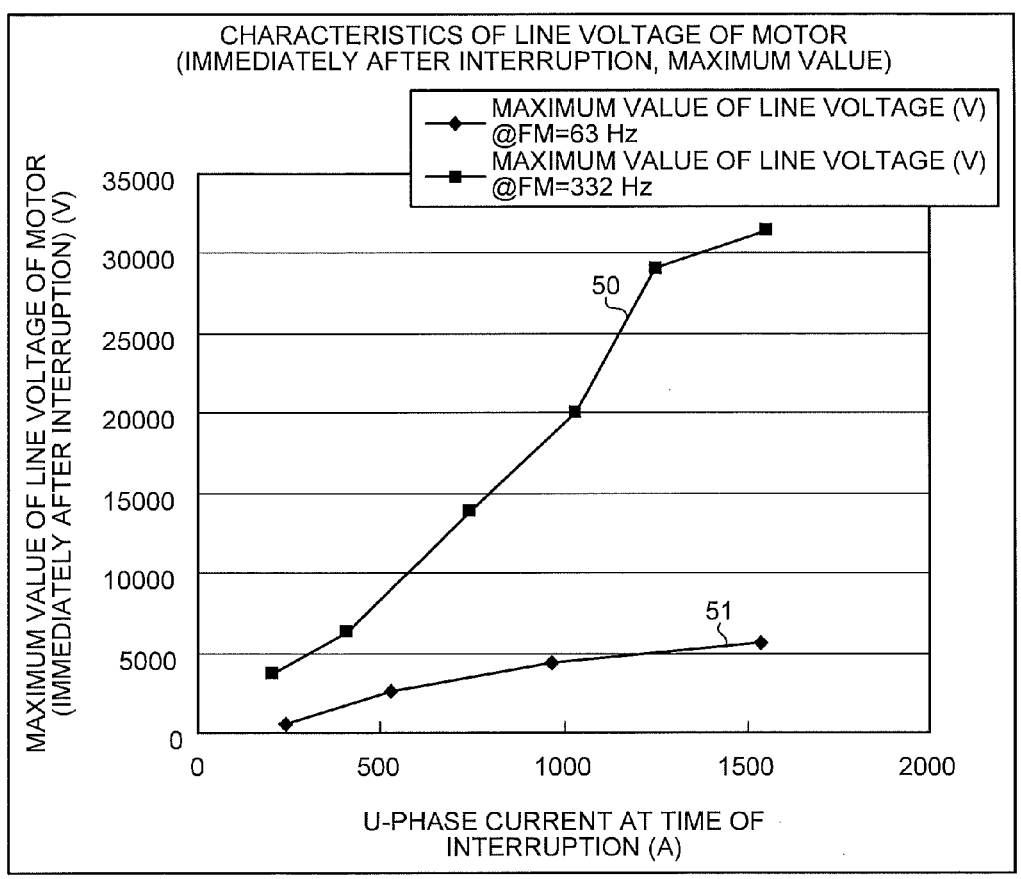
FIG. 4 is a characteristic diagram of a relationship between a magnitude of an uninterrupted phase current and a magnitude of a line voltage generated in a motor.

To facilitate understanding, the generation of the fault current, in which the phase in which a current zero point is not generated and the phase in which a current zero point is generated coexist, and the generation of an excessive voltage are explained first in detail (FIGS. 3 and 4). The configuration of the control unit 17A (FIGS. 5 and 6) and its operations (FIG. 7) are explained next in detail.

The followings are exemplar situations where the fault current is generated, in which the phase in which a current zero point is not generated and the phase in which a current zero point is generated coexist. The fault current is generated when one or more switching elements of the three upper arm elements (UP, VP, and WP) connected to the positive side conductor P and one or more switching elements of the three lower arm elements (UN, VN, and WN) connected to the negative side conductor N are subjected to a short-circuit fault. Also, the fault current is generated when these switching elements are remained switched on because of their faults or of a fault in a drive circuit (not shown).

FIG. 3 is a waveform diagram of an exemplary fault in which a phase in which a current zero point is not generated and a phase in which a current zero point is generated coexist in a fault current, current waveforms at the time of the fault, and a waveform of a line voltage of a motor. FIG. 4 is a characteristic diagram of a relationship between a magnitude of an uninterrupted phase current and a magnitude of a line voltage generated in a motor. FIG. 4 shows a situation where a fault has occurred and a phase in which a current zero point is not generated and a phase in which a current zero point is generated coexist in a fault current and when the phase in which a current zero point is generated is interrupted.

For example, assume a case that a short-circuit fault occurs in the U-phase upper-arm element UP and the V-phase lower-arm element VN when the AC motor 6 is rotating by the operation of the drive controller 10A for an AC motor. Further, the remaining switching elements (VP, WP, UN, and WN) are all switched off by a fault detecting unit provided in a higher-level device (not shown) in the control unit 17A.

In this case, a fault current flows between the AC motor 6 and the inverter 12 through the U-phase upper-arm element UP and the V-phase lower-arm element VN still switched on due to the short-circuit fault and diodes connected to the remaining switching elements (VP, WP, UN, and WN).

FIG. 3 depicts current waveforms (1) to (3) of the respective phases and a waveform (4) of a line voltage between the V-phase and the W-phase of the AC motor 6 when a short-circuit fault occurs in the U-phase upper-arm element UP and the V-phase lower-arm element VN and the remaining switching elements (VP, WP, UN, and WN) are all switched off, as described above.

With reference to FIG. 3, a time T1B indicates a time when a short-circuit fault occurs in the U-phase upper-arm element UP and the V-phase lower-arm element VN. The arm elements are normally operated before the time T1B. After the time T1B, the arm elements are operated in a fault state. The motor cut-off contactor 16 is closed by the contactor close command MKC being on until a time T2B immediately after the time T1B and then opened at the time T2B by the contactor close command MKC becoming off.

Before the time T1B when a short-circuit fault occurs in the U-phase upper-arm element UP and the V-phase lower-arm element VN, all switching elements in the inverter 12 are normal and the AC motor 6 is driven at a rotational frequency of 63 hertz. A normal current zero point appears in the current waveforms (1) to (3) of the respective phases. A normal positive-negative voltage waveform appears in the waveform (4) of the line voltage between the V-phase and the W-phase of the AC motor 6.

In a state that the AC motor 6 is driven at a rotational frequency of 63 hertz, a short-circuit fault occurs in the U-phase upper-arm element UP and the V-phase lower-arm element VN at the time T1B. The remaining switching elements (VP, WP, UN, and WN) are thus controlled to be switched off. During a time interval between the time T1B and the time T2B when the motor cut-off contactor 16 is opened, the U-phase current IU offsets greatly toward the positive side as represented by the waveform (1). The V-phase current IV offsets greatly toward the negative side as represented by the waveform (2). The U-phase current IU and the V-phase current IV have a waveform without any current zero point. On the contrary, the W-phase current IW exhibits an asymmetrical current change as shown by the waveform (3), in which the current zero point exists.

The reason why the U-phase current IU increases significantly offsetting toward the positive side and the V-phase current IV increases significantly offsetting toward the negative side is as follows. Because the U-phase upper-arm element UP and the V-phase lower-arm element VN are kept on-state, a DC voltage is applied from the filter capacitor 19 to between the U-phase and the V-phase of the AC motor 6. With this, a DC component is generated in the U-phase current IU and the V-phase current IV. When such a state is left as it is, the DC components of the U-phase current IU and the V-phase current IV are further increased, resulting in damages of the driving controller 10A for an AC motor.

To avoid this problem, the power-supply cut-off contactor 11 is opened and at the same time, the discharging circuit 18 is switched on in order to discharge charged electric charges in the filter capacitor 19 so that the DC component is not applied to the AC motor 6. To prevent a current from flowing from the AC motor 6 to the inverter 12, the motor cut-off contactor 16 must be opened to rapidly disconnect the inverter 12 from the AC motor 6.

Therefore, conventionally, the higher-level device (not shown), which has detected the fault, deenergizes the closing coil of the motor cut-off contactor 16 not to be excited immediately after the time T1B when the short-circuit fault occurs. The main contact of the motor cut-off contactor 16 is thus opened at the time T2B.

With reference to FIG. 3, because of the above operation, the W-phase current IW indicated by the waveform (3), in which a current zero point is generated, is interrupted to be zero at a time T3B immediately after the main contact of the motor cut-off contactor 16 is opened. The waveform (4) indicates that an excessive line voltage is generated between the V-phase and the W-phase of the AC motor 6. The waveforms (1) and (2) indicate that the U-phase current IU and the V-phase current IV offset and thus current zero points do not exist in the respective currents. Thus, the currents cannot be interrupted after the time T2B when the main contact of the motor cut-off contactor 16 is opened and still flow until a time T4B when a current zero point is generated.

When such a state continues, an arc continues to be generated between the U-phase contacts of the motor cut-off contactor 16 and between the V-phase contacts thereof, the motor cut-off contactor 16 can be broken because of heat generated by the arc. Gas due to the arc can cause a decrease in surrounding insulation and short-circuits within the motor cut-off contactor 16 and of its peripheral main circuits.

An excessive voltage between lines between the V-phase and the W-phase of the AC motor 6 is generated by a factor characteristic of a permanent magnet synchronous motor configured by burying a permanent magnet in a rotor. Specifically, the excessive voltage is generated based on the magnitude of inductance of a stator coil, which varies according to a rotational angle of a rotor, the change of the inductance by time, and the magnitude of a current and its change by time as main factors. The magnitude of the excessive voltage is indicated as a little less than twice a rated voltage in FIG. 3. As described with reference to FIG. 4, however, as the current when the main contact of the motor cut-off contactor 16 is opened becomes large or as the rotational frequency of the AC motor 6 is increased, the magnitude of the excessive voltage is increased and its maximum value reaches ten times the rated voltage.

FIG. 4 is an example of relationship characteristics between the magnitude of the U-phase current IU and the magnitude of the line voltage generated in the AC motor 6 when the W-phase current IW is interrupted. Reference numeral 50 denotes a characteristic when the rotational frequency FM of the AC motor 6 is 332 hertz. Reference numeral 51 denotes a characteristic when the rotational frequency FM of the AC motor 6 is 63 hertz.

With reference to FIG. 4, when the U-phase current IU is about 1500 amperes at the time when the W-phase current IW is interrupted in the characteristic 51, in which the rotational frequency FM of the AC motor 6 is 63 hertz, an excessive voltage such as 5 kilovolts or higher is applied to between lines of the AC motor 6. On the other hand, when the U-phase current IU is about 1500 amperes at the time when the W-phase current IW is interrupted in the characteristic 50, in which the rotational frequency FM of the AC motor 6 is 332 hertz which is the maximum frequency, an excessive voltage such as 30 kilovolts or higher is applied to between the lines of the AC motor 6.

The excessive line voltage of the characteristic 50 is about ten times larger than the rated voltage. Insulation of the AC motor 6 and main circuits on the AC motor 6 side downstream of the motor cut-off contactor 16 (for example, the motor cut-off contactor 16 and the motor-side U-phase conductor UM, the motor-side V-phase conductor VM, and the motor-side W-phase conductor WM connecting the motor cut-off contactor 16 to the AC motor 6) can be broken down accordingly, leading to damage of the driving controller 10A for an AC motor.

The voltage applied to the inverter 12 (a bus voltage) and the voltages of the inverter-side U-phase conductor UI, the inverter-side V-phase conductor VI, and the inverter-side W-phase conductor WI connecting the inverter 12 to the motor cut-off contactor 16 (a line voltage and a voltage to the ground) are not increased to the terminal voltage of the filter capacitor 19 (an overhead electric-wire voltage) or higher due to a diode element incorporated in the switching element. That is, the insulation between the upper and the lower arm elements of the inverter 12 and the insulation of the inverter-side U-phase conductor UI, the inverter-side V-phase conductor VI, and the inverter-side W-phase conductor WI connecting the inverter 12 to the motor cut-off contactor 16 are not broken down.

Figure 5:
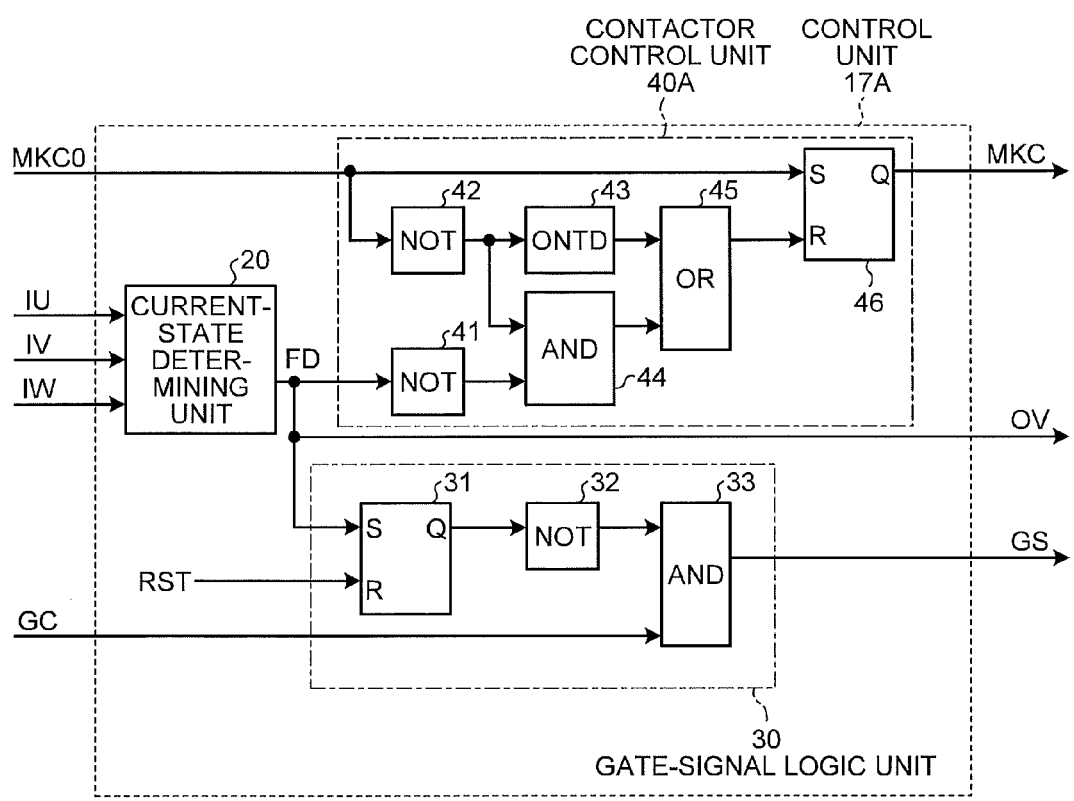
FIG. 5 is a block diagram of a configuration example of a control unit shown in FIG. 1.
Figure 6:
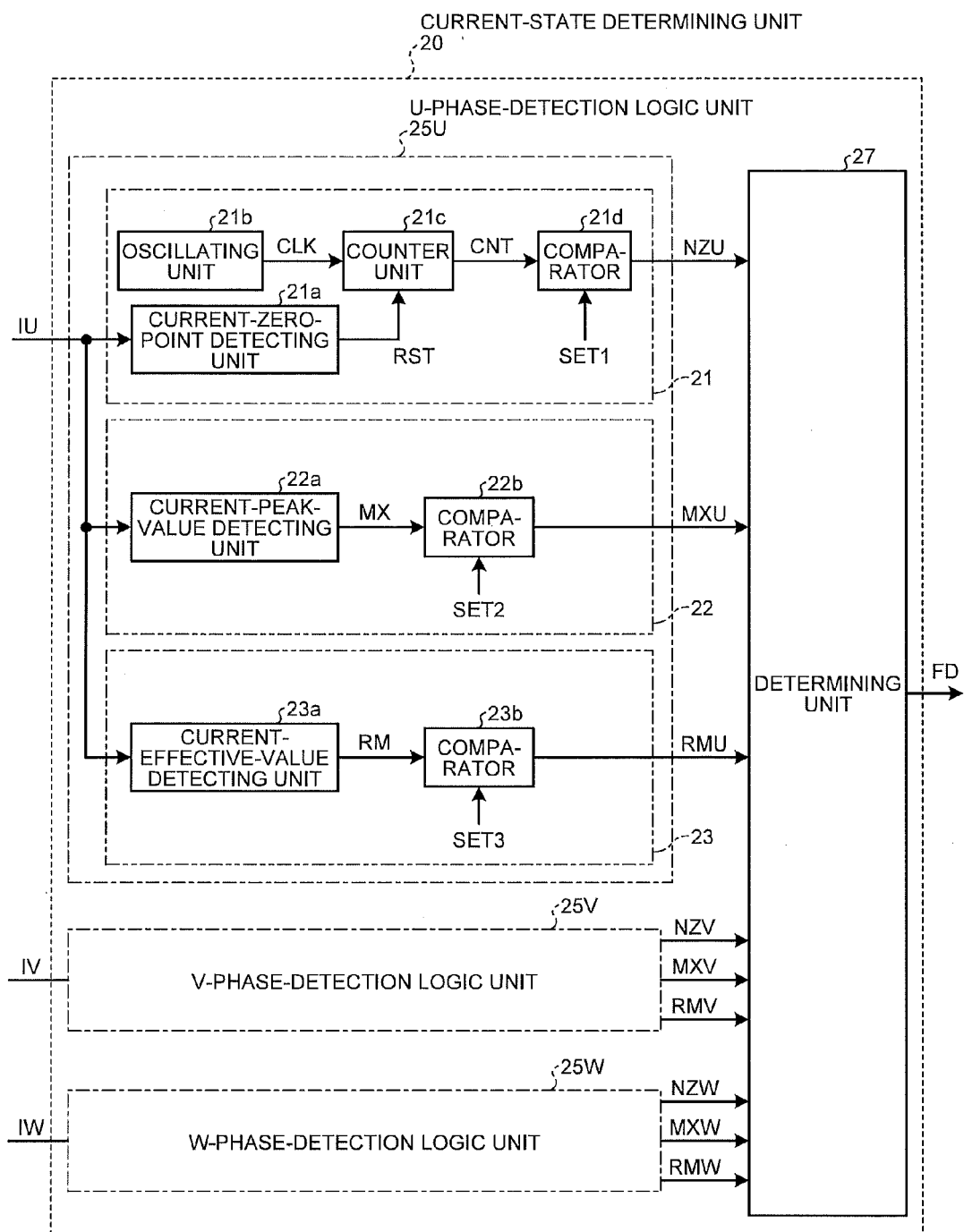
FIG. 6 is a block diagram of a configuration example of a current-state determining unit shown in FIG. 5.

The control unit 17A is configured based on the findings mentioned above. FIG. 5 is a block diagram of a configuration example of the control unit 17A shown in FIG. 1. FIG. 6 is a block diagram of a configuration example of a current-state determining unit 20 shown in FIG. 5.

As shown in FIG. 5, the control unit 17A includes, for example, the current-state determining unit 20, a gate-signal logic unit 30, and a contactor control unit 40A. These units are described below in this order.

The three-phase currents IU, IV, and IW detected by the current detectors 13, 14, and 15 are inputted to the current-state determining unit 20. The current-state determining unit 20 monitors the state of the detected three-phase currents IU, IV, and IW and outputs the result of monitoring as a current state signal FD serving as a determination signal by a configuration to be described later shown in FIG. 6. The current state signal FD is outputted to the gate-signal logic unit 30 and to the contactor control unit 40A. The current state signal FD is also outputted as the discharge command OV to the discharging circuit 18.

Configuration of Gate-Signal Logic Unit 30

The gate-signal logic unit 30 includes a latch circuit 31, a NOT circuit (NOT) 32, and a two-input AND circuit (AND) 33. The current state signal FD is inputted to a set terminal S of the latch circuit 31. A reset signal RST generated by the higher-level device (not shown) is inputted to a reset terminal R of the latch circuit 31. An output level held at an output terminal Q of the latch circuit 31 is inverted by the NOT circuit 32 to become one input of the AND circuit 33. The other input of the AND circuit 33 is the basic gate signal GC generated by the external higher-level device (not shown). An output of the AND circuit 33 is the gate signal GS to the inverter 12.

The basic gate signal GC is a binary control signal for determining on or off states of the six switching elements in the inverter 12. The basic gate signal GC is generated in the external higher-level device (not shown) by a vector control method or the like to obtain the torque or the number of revolutions of the AC motor 6 required when accelerating or de-accelerating an electric vehicle.

Operation of Gate-Signal Logic Unit 30

When the current state signal FD is low level (hereinafter, "L level") which is an off state, the output of the NOT circuit 32 is high level (hereinafter, "H level") which is an on state. The AND circuit 33 thus outputs a logical value of the basic gate signal GC as the gate signal GS. The inverter 12 then switches on or off the six switching elements in a predetermined manner.

When the current state signal FD is changed from L level to H level, the output of the NOT circuit 32 becomes L level. Accordingly, the AND circuit 33 outputs an L-level gate signal GS regardless of the logic state of the basic gate signal GC. The inverter 12 then switches off the six switching elements.

That is, when the current state signal FD is once changed from L level to H level, the latch circuit 31 holds the H level. Accordingly, the L level (off state) of the gate signal GS is maintained regardless of the logic state of the basic gate signal GC. In order to on-off control the switching elements again, the higher-level device (not shown) needs to generate the reset signal RST to release the latch of the latch circuit 31, so that the gate signal GS corresponding to the logic state of the basic gate signal GC is outputted.

Configuration of Contactor Control Unit 40A

The contactor control unit 40A includes NOT circuits 41 and 42, an time delayelement circuit (ONTD) 43, a two-input AND circuit (AND) 44, a two-input OR circuit (OR) 45, and a latch circuit 46. The basic contactor-close command MKC0 generated by the higher-level device (not shown) is inputted to the NOT circuit 42 and to a set terminal S of the latch circuit 46. The current state signal FD from the current-state determining unit 20 is inputted to the NOT circuit 41.

The time delayelement circuit 43 delays the basic contactor-close command MKC0, which is inverted by the NOT circuit 42, within a set time and outputs the command MKC0 to one input terminal of the OR circuit 45. The AND circuit 44 AND-operates the basic contactor-close command MKC0, which is inverted by the NOT circuit 42, and the current state signal FD, which is inverted by the NOT circuit 41, and outputs the operation result to the other input terminal of the OR circuit 45. An output of the OR circuit 45 is inputted to a reset terminal R of the latch circuit 46. A level signal held at an output terminal Q of the latch circuit 46 is provided as the contactor close command MKC to the motor cut-off contactor 16.

The basic contactor-close command MKC0 is a binary control signal for providing instructions to the control unit 17A to control the motor cut-off contactor 16 to be closed during the operation of the AC motor 6 and to control the motor cut-off contactor 16 to be opened when the operation of the AC motor 6 is stopped or when a fault occurs in the inverter 12.

Operation of Contactor Control Unit 40A

When the current state signal FD is L level, the output of the NOT circuit 41 is H level. With this, the latch circuit 46 is reset and outputs the contactor close command MKC which becomes on (H level) or off (L level) in synchronization with the on (H level) or off (L level) of the basic contactor-close command MKC0.

When the current state signal FD is changed from L level to H level, the output of the NOT circuit 41 becomes L level. When the basic contactor-close command MKC0 is H level under such a circumstance, the latch circuit 46 outputs the H-level contactor-close command MKC. However, when the basic contactor-close command MKC0 is changed to L level, while the output of the NOT circuit 41 becomes H level, the latch circuit 46 is not reset until the set time in the time delayelement circuit 43 elapses.

That is, when the current state signal FD is changed from L level to H level, the latch circuit 46 holds H level until the set time in the time delayelement circuit 43 elapses even if the basic contactor-close command MKC0 is changed to L level. The contactor close command MKC is thus forbidden to become off (L level). According to this case, the latch circuit 46 is reset by the output of the AND circuit 44 after the current state signal FD is changed from H level to L level, so that the contactor close command MKC becomes off (L level).

Furthermore, when the current state signal FD is still H level, the latch circuit 46 is reset when the set time in the time delayelement circuit 43 elapses after the basic contactor-close command MKC0 is changed to L level. Thus, the contactor close command MKC is made to become off (L level). Consequently, when the current state signal FD continues to be H level improperly because of any cause, the contactor close command MKC can be made to become off forcibly.

A configuration and operations of the current-state determining unit 20 are described next with reference to FIG. 6.

Configuration of Current-State Determining Unit 20

As shown in FIG. 6, the current-state determining unit 20 includes a U-phase-detection logic unit 25U, a V-phase-detection logic unit 25V, a W-phase-detection logic unit 25W, and a determining unit 27. The detected three-phase currents IU, IV, and IW are inputted to the respective U-phase-detection logic unit 25U, the V-phase-detection logic unit 25V, and the W-phase-detection logic unit 25W. The current state signal FD is outputted from the determining unit 27, to which outputs of the respective detection logic units are inputted in parallel.

These three detection logic units have a same configuration, that is, the one shown in the U-phase-detection logic unit 25U. The U-phase-detection logic unit 25U is explained below representatively.

The U-phase-detection logic unit 25U includes a current-zero-point-state detecting unit 21, a current-peak-value-state detecting unit 22, and a current-effective-value-state detecting unit 23 to each of which the U-phase current IU is inputted in parallel. The V-phase-detection logic unit 25V and the W-phase-detection logic unit 25W have the same configuration.

The current-zero-point-state detecting unit 21 includes a current-zero-point detecting unit 21a, an oscillating unit 21b, a counter unit 21c, and a comparator 21d. The current-zero-point-state detecting unit 21 generates and outputs a current-zero-point state signal NZU based on the inputted U-phase current IU. The current-peak-value-state detecting unit 22 includes a current-peak-value detecting unit 22a and a comparator 22b. The current-peak-value-state detecting unit 22 generates and outputs a current-peak-value state signal MXU based on the inputted U-phase current IU. The current-effective-value-state detecting unit 23 includes a current-effective-value detecting unit 23a and a comparator 23b. The current-effective-value-state detecting unit 23 generates and outputs a current-effective-value state signal RMU based on the inputted U-phase current IU.

Operation of U-Phase-Detection Logic Unit 25U

First, in the current-zero-point-state detecting unit 21, the current-zero-point detecting unit 21a compares the inputted U-phase current IU to zero and outputs a counter reset signal RST to the counter unit 21c every time when the U-phase current crosses zero. The counter unit 21c counts up by using a clock pulse CLK outputted from the oscillating unit 21b at a predetermined period, and outputs its count value CNT to the comparator 21d. The comparator 21d compares the count value CNT to a first set value SET. When the count value CNT exceeds the first set value SET1, the comparator determines that a current zero point is not generated and makes the current-zero-point state signal NZU become on (H level).

When the reset signal RST described above is inputted, the counter unit 21c is reset and the count value CNT becomes an initial value, such as zero.

When the inverter 12 is normal, the U-phase current IU has a sinusoidal waveform regularly generating zero-crosses. The count value CNT of the counter unit 21c is thus reset to a predetermined value, that is, returned to zero by the counter reset signal RST generating in synchronization with the zero-cross. Such a series of operations is repeated. In such a case, the count value CNT of the counter unit 21c does not exceed the first set value SET1 and the current-zero-point state signal NZU is still off (L level).

Meanwhile, when an abnormality occurs in the inverter 12 and the U-phase current IU offsets, so that the zero-cross does not exist, the counter reset signal RST in synchronization with the zero-cross is not generated. Then, the count value CNT of the counter unit 21c continues to be increased. The count value CNT of the counter unit 21c thus exceeds the first set value SET1, so that the current-zero-point state signal NZU becomes on (H level).

The first set value SET1 is preferably set so as not to be detected by mistake when the AC motor 6 rotates at a low speed (a low frequency). When the number of revolutions of the AC motor 6 is reduced, the fundamental wave frequency of a current is reduced correspondingly, and thus the period thereof is extended. Accordingly, the time between zero-crosses of the current is extended.

Thus, the first set value SET1 is preferably changed depending on the rotational frequency of the AC motor 6 or the fundamental wave frequency of drive current of the AC motor 6. When the AC motor 6 is operated at a significantly low speed, outputting the current-zero-point state signal NZU is preferably masked to prevent the current-zero-point state signal from being outputted by mistake.

Next, in the current-peak-value-state detecting unit 22, the current-peak-value detecting unit 22a detects the maximum value of magnitude of the inputted U-phase current IU and outputs the magnitude as a signal MX to the comparator 22b. The comparator 22b compares the inputted signal MX to a second set value SET2. When the signal MX exceeds the second set value SET2, the comparator 22b determines that the current peak value is excessive and makes the current-peak-value state signal MXU become on (H level). The second set value SET2 is preferably set to exceed a little the maximum current which is usually generated in the AC motor 6 when the inverter 12 is normal, so that erroneous detection is prevented.

When the inverter 12 is normal, the magnitude of the U-phase current IU is not excessive and the magnitude signal MX of the current IU is lower than the second set value SET2. The current-peak-value state signal MXU is thus off (L level).

Meanwhile, when an abnormality occurs in the inverter 12 and the peak value of the U-phase current IU is excessive as shown in FIG. 3, the magnitude signal MX exceeds the second set value SET2. Thus, the current-peak-value state signal MXU becomes on (H level).

Next, in the current-effective-value-state detecting unit 23, the current-effective-value detecting unit 23a detects the effective value of the inputted U-phase current IU and outputs the magnitude to the comparator 23b as a magnitude signal RM. The comparator 23b compares the inputted signal RM to a third set value SET3. The comparator 23b determines that the current effective value is excessive when the signal RM exceeds the third set value SET3, and makes the current-effective-value state signal RMU become on (H level). To prevent erroneous detection, the third set value SET3 is preferably set so as to exceed a little the maximum current usually generated in the AC motor 6 when the inverter 12 is normal.

When the inverter 12 is normal, the effective value of the U-phase current IU is not excessive and the magnitude signal RM is lower than the third set value SET3. The current-effective-value state signal RMU is thus off (L level).

Meanwhile, when an abnormality occurs in the inverter 12 and the effective value of the U-phase current IU is excessive as shown in FIG. 3, the magnitude signal RM exceeds the third set value SET3. In such a case, the current-effective-value state signal RMU becomes on (H level).

Regarding the V-phase and the W-phase, the same operation is performed in the V-phase-detection logic unit 25V and in the W-phase-detection logic unit 25W in the same manner as that described above. That is, the V-phase-detection logic unit 25V generates a current-zero-point state signal NZV, a current-peak-value state signal MXV, and a current-effective-value state signal RMV based on the V-phase current IV. The W-phase-detection logic unit 25W generates a current-zero-point state signal NZW, a current-peak-value state signal MXW, and a current-effective-value state signal RMW based on the W-phase current IW.

The resultant signals NZU, MXU, RMU, NZV, MXV, RMV, NZW, MXW, and RMW are inputted to the determining unit 27 in parallel. When any of these signals is on (H level), the determining unit 27 makes the current state signal FD become on (H level) to indicate the occurrence of an abnormality. When all of these signals then become off (L level), the current state signal FD is made to be off (L level) to indicate a normal state. When the inverter 12 is normal, the current state signal FD remains off (L level).

According to such a configuration, the control unit 17A always understands the states of the phase currents IU, IV and IW and when an abnormality occurs, makes the gate signal GS become off (L level). Further, the control unit 17A can instruct the motor cut-off contactor 16 to open even though the basic contactor-close command MKC0 is off (L level) when a current is in a state suitable for interruption, that is, when a zero point is generated at a current and its peak value and its effective value are less than predetermined values.

Figure 7:
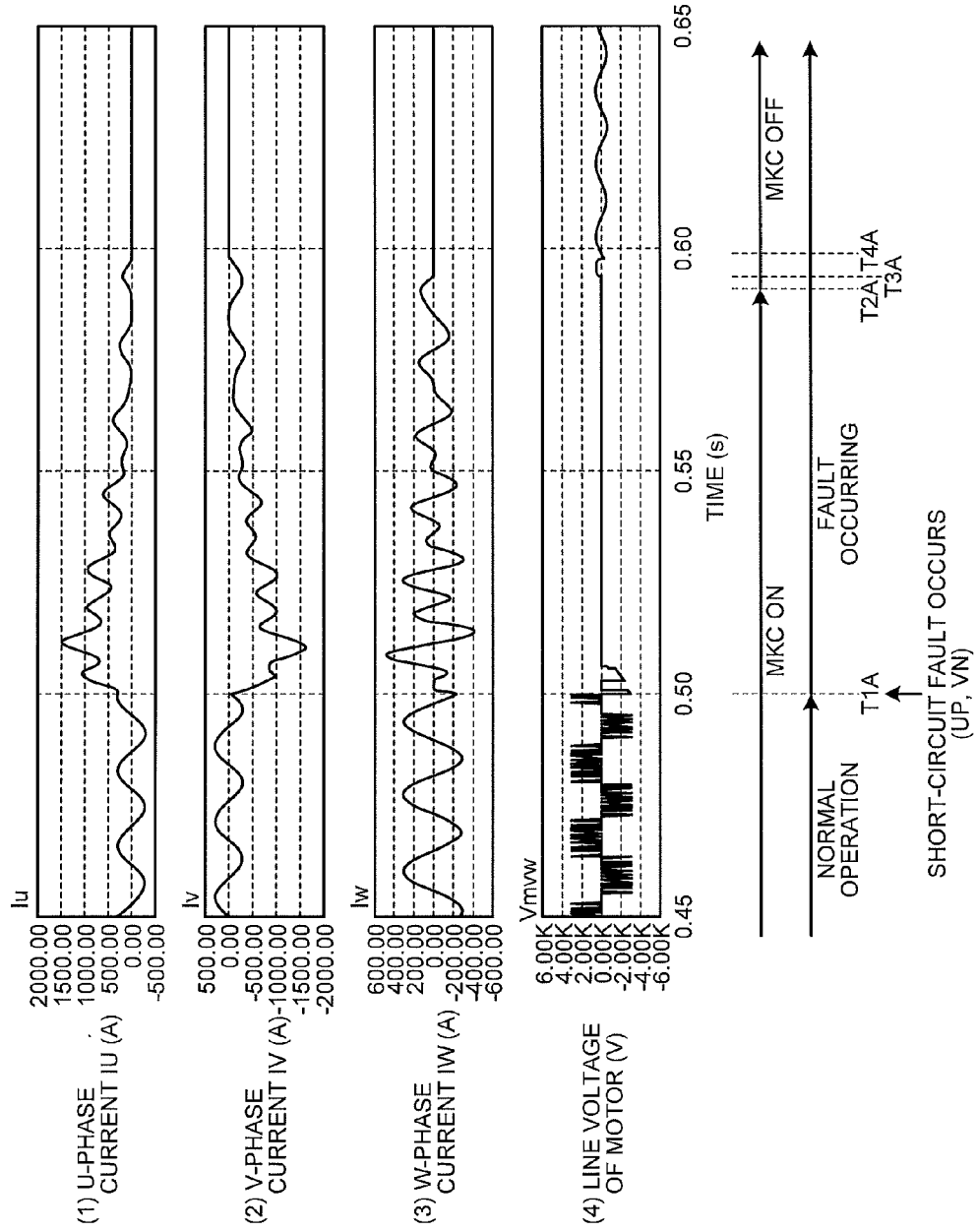
FIG. 7 is a waveform diagram explaining a control operation of the first embodiment in which a current is interrupted by generating a current zero point in a phase not having a current zero point when a fault shown in FIG. 3 occurs.

A control operation performed by the control unit 17A with the configuration described above when a fault occurs is explained next with reference to FIG. 7. FIG. 7 is a waveform diagram explaining a control operation of the first embodiment in which a current is interrupted by generating a current zero point in a phase not having a current zero point when a fault shown in FIG. 3 occurs.

FIG. 7 depicts the current waveforms (1) to (3) of the respective phases and the waveform (4) of a line voltage between the V-phase and the W-phase of the AC motor 6. These waveforms are in a state that a short-circuit fault occurs in the U-phase upper-arm element UP and the V-phase lower-arm element VN and the remaining switching elements (VP, WP, UN, and WN) are all switched off as in FIG. 3.

In FIG. 7, a time T1A indicates a time when a short-circuit fault occurs in the U-phase upper-arm element UP and the V-phase lower-arm element VN. The U-phase upper-arm element UP and the V-phase lower-arm element VN are normally operated before the time T1A and operated under a defective state after the time T1A. The motor cut-off contactor 16 is closed until a time T2A after the time T1A because the contactor close command MKC is on (H level). The contactor close command MKC becomes off (L level) at the time T2A, so that the motor cut-off contactor 16 is opened. As shown in FIG. 7, the time T2A when the motor cut-off contactor 16 is opened is significantly later than the time T2B according to the related technique shown in FIG. 3.

Before the time T1A when a short-circuit fault occurs in the U-phase upper-arm element UP and the V-phase lower-arm element VN, all the switching elements in the inverter 12 are normal and the AC motor 6 is driven at a rotational frequency of 63 hertz. A normal current zero point appears in the current waveforms (1) to (3) of the respective phases. A normal positive-negative voltage waveform appears in the waveform (4) of a line voltage between the V-phase and the W-phase of the AC motor 6.

A short-circuit fault occurs at the time T1A in the U-phase upper-arm element UP and the V-phase lower-arm element VN while the AC motor 6 is driven at a rotational frequency of 63 hertz. The remaining switching elements (VP, WP, UN, and WN) are thus controlled to be switched off. The U-phase current IU offsets significantly toward the positive side as shown by the waveform (1). The V-phase current IV offsets significantly toward the negative side as shown by the waveform (2). The waveforms (1) and (2) do not have any current zero point. The W-phase current IW exhibits an asymmetrical change as shown by the waveform (3); however, the current zero point exists. The reason why these waveforms are obtained is the same as the one described with reference to FIG. 3.

When a short-circuit fault occurs at the time T1A, the higher-level device (not shown) that has detected the fault opens the power-supply cut-off contactor 11 immediately after the time T1A as described with reference to FIG. 3. Also, the higher-level device switches on the discharging circuit 18 to discharge electric charges in the filter capacitor 19, in order to prevent a DC voltage from being applied to the AC motor 6. The higher-level device (not shown) also makes the basic contactor-close command MKC0 become off (L level) to prevent a current from flowing from the AC motor 6 to the inverter 12.

The control unit 17A according to the first embodiment holds the on state (H level) of the contactor close command MKC even after the basic contactor-close command MKC0 becomes off (L level). While the on state of the contactor close command MKC is held, the power-supply cut-off contactor 11 is opened and the filter capacitor 19 is discharged by the discharging circuit 18, so that application of a DC voltage to the AC motor 6 is eliminated.

In this manner, as shown by the waveforms (1) to (3), the U-phase current IU and the V-phase current IV attenuate, so that current zero points are generated in the U-phase current IU, the V-phase current IV, and the W-phase current IW. At the time (the time T2A) when the current peak value and the effective value are less than predetermined values, the contactor close command MKC is made to become off (L level). Thus, the closing coil of the motor cut-off contactor 16 is not excited and is deenergized.

Thus, the main contact of the motor cut-off contactor 16 is opened at a time T3A immediately after the time T2A. The W-phase current IW is thus interrupted first at the current zero point. The V-phase current IV and the U-phase current IU are then interrupted at their current zero points in this order. The three-phase currents have been interrupted at a time T4A.

With this operation, when the W-phase current IW is interrupted at the current zero point at the time T3A, an excessive voltage is not generated in the line voltage of the AC motor 6 by the above operation as shown by the waveform (4). Accordingly, insulation of the AC motor 6 and of AC motor side main circuits provided downstream of the motor cut-off contactor 16 (for example, the motor cut-off contactor 16 and the motor-side U-phase conductor UM, the motor-side V-phase conductor VM, and the motor-side W-phase conductor WM connecting the motor cut-off contactor 16 to the AC motor 6) is not broken down and damage of the drive controller 10A for an AC motor can be prevented.

Because the main contact of the motor cut-off contactor 16 is opened after the current zero points are generated in all the phases, the time darling when an arc occurs between contacts of the motor cut-off contactor 16 is short, that is, from the time T2A to the time T4A. Unlike the case of the related technique shown in FIG. 3, the occurrence of an arc for a long time (the time T2B to the time T4B) can be prevented and thus damage of the motor cut-off contactor 16 caused by generated heat can be prevented. Because a decrease in surrounding insulation caused by gas of the arc can be prevented, short-circuits within the motor cut-off contactor 16 and of peripheral main circuits can be prevented.

It is understood by FIG. 7 that, even when the motor cut-off contactor 16 remains closed after the time T1A when a short-circuit fault occurs, the U-phase current IU, the V-phase current IV, and the W-phase current IW have a temporal large amplitude immediately after the time T1A; however, their amplitudes are reduced thereafter by discharging the filter capacitor 19, which results in generating current zero points in the three phases.

Because the motor cut-off contactor 16 remains closed after the time T1A, a short-circuit current cannot be interrupted rapidly. This looks opposite to the original goal that the motor cut-off contactor 16 is provided. Even when the motor cut-off contactor 16 remains closed, however, an excessive current does not flow continuously. Damage of short-circuited parts may not be extended. On the contrary, an excessive voltage generated when the motor cut-off contactor 16 is disconnected can be suppressed. That is, the configuration described above of the control unit 17A utilizes wisely the behavior of a phase current. Naturally, the power-supply cut-off contactor 11 must be opened and the filter capacitor 19 must be discharged by the discharging circuit 18 before the motor cut-off contactor 16 is opened.

As described above, a plurality of items for the U-phase current IU, that is, the existence of a current zero point, the state of a peak value, and the state of an effective value is monitored. With this, even when a complicated and distorted current waveform is generated from a sinusoidal wave because of an abnormality, the state of the current abnormality can be understood reliably. At least one of the existences of a current zero point, the state of a peak value, and the state of an effective value can be monitored. However, when only the state of a current effective value is monitored, for example, a current waveform whose peak value is large but whose effective value is small because of an abnormality cannot be detected.

Assume a case that the current state signal FD is kept on state (H level) in a situation that the abnormality of the U-phase current IU and the V-phase current IV does not disappear because electric charges of the filter capacitor 19 are not discharged by the fault of the discharging circuit 18 and the power-supply cut-off contactor 11. In such a case, the contactor close command MKC can be forcibly made to become off after the set delay time of the time delay element circuit 43 elapses by the operation of the ONTD circuit 43 and the OR circuit 45 shown in FIG. 5. Therefore, continuous formation of short-circuits including the AC motor 6 can be prevented.

As described above, when a fault current, in which the phase in which a current zero point is not generated and the phase in which a current zero point is generated coexist, flows between the inverter 12 and the AC motor 6, generation of an excessive voltage between lines of the AC motor 6 and between contacts of the motor cut-off contactor 16 can be prevented and a generation of continuous arc between the contacts of the motor cut-off contactors can be prevented, regardless of the type of a fault occurred in the first embodiment. It is possible to obtain the driving controller for an AC motor in which insulation of coils in a motor, a motor cut-off contactor, and cables connecting the motor cut-off contactor to the motor is not broken down and the motor cut-off contactor is not damaged by an arc between contacts of the motor cut-off contactors, regardless of the type of a fault occurred.

Second Embodiment

Figure 8:
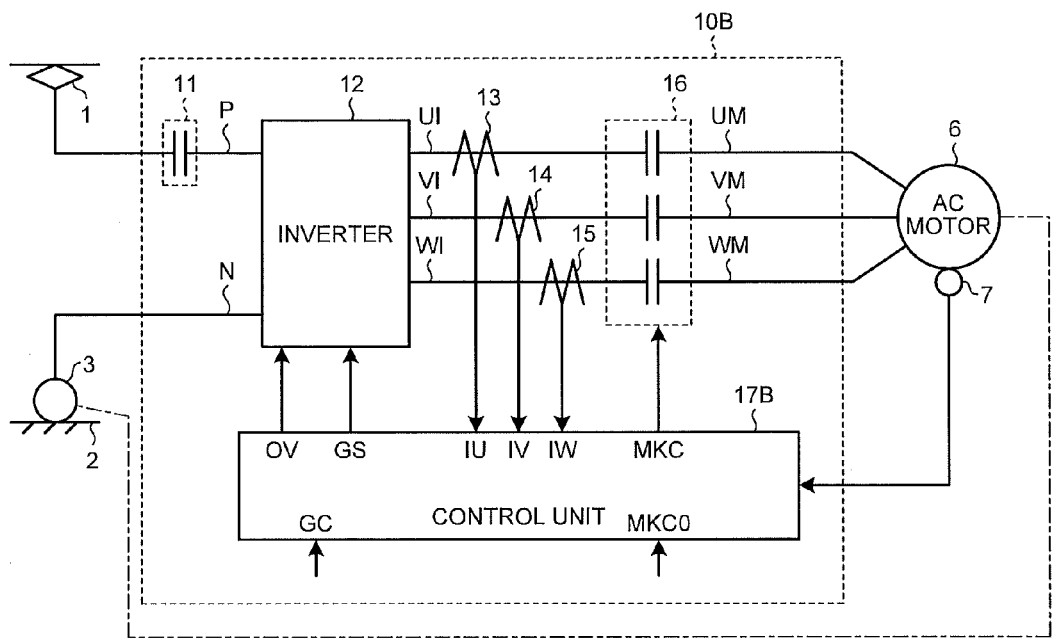
FIG. 8 is a block diagram of a configuration example of a driving controller for an AC motor according to a second embodiment of the present invention.

FIG. 8 is a block diagram of a configuration example of a driving controller for an AC motor according to a second embodiment of the present invention. In FIG. 8, like reference numerals are denoted to like components as those shown in FIG. 1 (the first embodiment). Parts relating to the second embodiment are mainly explained below.

As shown in FIG. 8, according to a driving controller 10B for an AC motor of the second embodiment, a control unit 17B instead of the control unit 17A is provided in the configuration shown in FIG. 1 (the first embodiment). The control unit 17B has a configuration shown in FIG. 9, for example.

Figure 9:
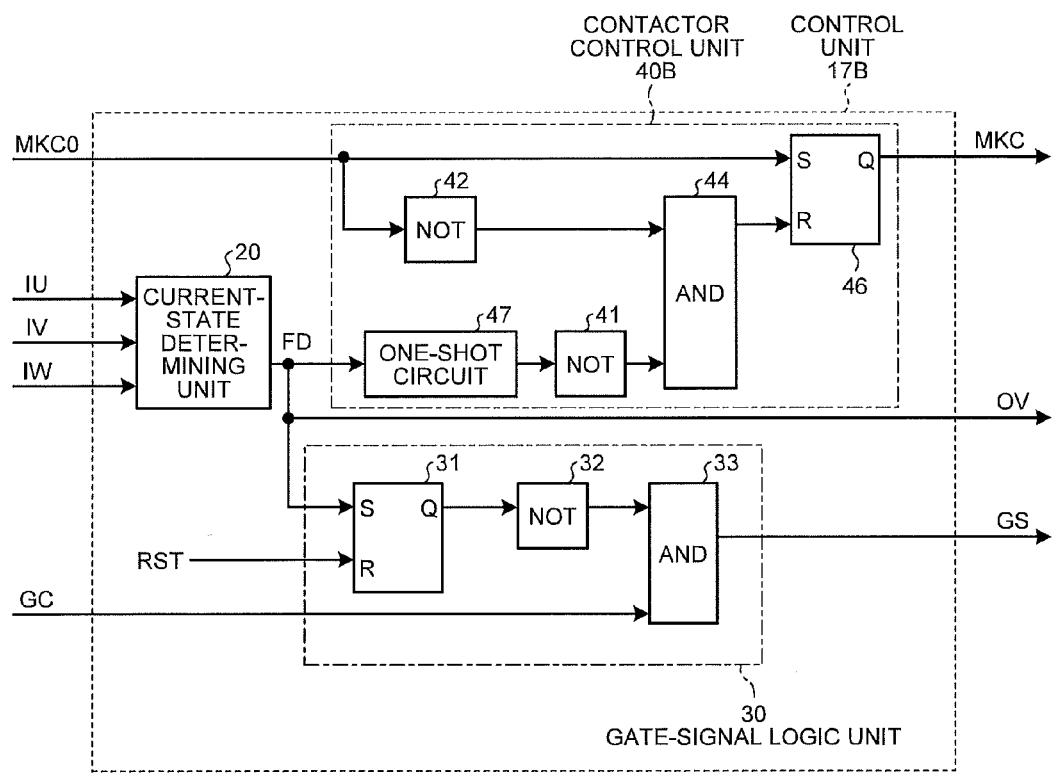
FIG. 9 is a block diagram of a configuration example of a control unit shown in FIG. 8.

A configuration and operations of the control unit 17B are explained below with reference to FIG. 9. In FIG. 9, like reference numerals are denoted to like components as those shown in FIG. 5 (the first embodiment). Parts relating to the second embodiment are mainly explained below.

As shown in FIG. 9, the control unit 17B is configured such that a contactor control unit 40B instead of the contactor control unit 40A is provided in the configuration of FIG. 5 (the first embodiment). In the contactor control unit 40B, a one-shot circuit 47 is provided at an input stage of the NOT circuit 41, the time delay element circuit 43 and the OR circuit 45 are removed, and the output of the AND circuit 44 is directly connected to the reset terminal R of the latch circuit 46 in the contactor control unit 40A. Accordingly, an operation of the contactor control unit 40B is explained as the operation of the control unit 17B.

Operation of Contactor Control Unit 40B

When the current state signal FD is L level, the output of the NOT circuit 41 is H level. The latch circuit 46 is thus reset and outputs the contactor close command MKC which becomes on (H level) or off (L level) in synchronization with the basic contactor-close command MKC0 becoming on (H level) or off (L level).

When the current state signal FD is changed from L level to H level, the output of the one-shot circuit 47 becomes on (H level) for a predetermined set time and the output of the NOT circuit 41 becomes L level for the predetermined set time. Accordingly, the latch circuit 46 is not reset.

That is, when the current state signal FD is changed from L level to H level, the contactor close command MKC does not become off (L level) for a predetermined time during which the output of the one-shot circuit 47 is on (H level) even if the basic contactor-close command MKC0 becomes off (L level). When the output of the one-shot circuit 47 becomes off (L level), the output of the NOT circuit 41 becomes H level. The latch circuit 46 is thus reset and the contactor close command MKC becomes off (L level).

The period of time during which the one-shot circuit 47 is on (H level) is preferably calculated and set in advance by simulating the time until an abnormality of a current disappears after a fault in the inverter 12. Specifically, about 100 milliseconds is suitable according to the example of waveforms shown in FIG. 7.

Such a configuration enables the same function as that of the first embodiment to be configured by less logical processes.

Among the functional elements of the control unit 17A shown in the first embodiment and the control unit 17B shown in the second embodiment, the current-state determining unit 20 and the contactor control units 40A and 40B can be incorporated within the motor cut-off contactor 16.

A delay mechanism can be provided within the motor cut-off contactor 16 to open the main contact thereof after a predetermined delay time elapses when the contactor close command MKC inputted by the control units 17A and 17B becomes off (L level).

Such a delay mechanism can prevent an excessive voltage from being applied to the AC motor 6 because the predetermined delay time can be ensured before the main contact of the motor cut-off contactor 16 is opened. This configuration is useful when a fault occurs in, for example, a control power supply (not shown) supplying power to the control units 17A and 17B and thus the control units 17A and 17B cannot perform predetermined logical processes described in the first and second embodiments, resulting in the contactor close command MKC becoming off (L level).

It is needless to mention that the control power supply, which supplies power to the control units 17A and 17B, preferably has a backup function capable of supplying power to the control units 17A and 17B for some time at the time of a fault.

According to control performed by the control units 17A and 17B with the configuration described above at the time of a fault, the generation of an excessive voltage can be prevented by opening the motor cut-off contactor 16. When the set time in the time delay element circuit 43 and the one-shot circuit 47 exceeds or when a fault occurs in the control units 17A and 17B under a state that the current state signal FD is kept on (H level) by any cause, the motor cut-off contactor 16 is possibly opened regardless of the state of a current. To prevent the current detectors 13, 14, and 15 and other voltage detector (not shown) from being broken even under the above state, they are preferably provided on the inverter-side U-phase conductor UI, the inverter-side V-phase conductor VI, and the inverter-side W-phase conductor WI.

This is because, as described above, there is a possibility that insulation of the current detectors 13, 14, and 15 and other voltage detector is broken down and damaged by an excessive voltage, which is generated when the motor cut-off contactor 16 is controlled to be opened at the time of abnormality of the inverter 12, in the motor-side U-phase conductor UM, the motor-side V-phase conductor VM, and the motor-side W-phase conductor WM. Meanwhile, an excessive voltage is not generated in the inverter-side U-phase conductor UI, the inverter-side V-phase conductor VI, and the inverter-side W-phase conductor WI in such a case and thus the current detectors 13, 14, and 15 and other voltage detectors are not damaged.

The configurations described in the above embodiments are merely examples of contents of the present invention and they can be combined with other known techniques. It is needles to mention that these configurations can be modified without departing from the scope of the present invention, such as omitting a part of the configurations.

For example, in the present specification, the configuration of receiving a DC voltage from the current collector 1 and directly inputting the voltage via the power-supply cut-off contactor 11 to the inverter 12 has been explained. It is also possible to provide a configuration of receiving an AC voltage from the current collector 1, inputting the AC voltage via the power-supply cut-off contactor 11 to a converter circuit that converts the AC voltage to a DC voltage, and inputting the DC voltage as an output of the converter circuit to the inverter 12. Such a configuration is suitable for electric vehicles for AC electrification sections.

While the present specification describes the present invention as an invention applied to a driving controller for an AC motor incorporated in an electric vehicle, the applicable field of the present invention is not limited thereto. It is needless to mention that the invention can be applied to other synchronous motor drive systems, such as related techniques including electric cars.

INDUSTRIAL APPLICABILITY

As described above, the driving controller for an AC motor according to the present invention is useful as a driving controller for an AC motor. Even when a phase in which a current zero point is not generated and a phase in which a current zero point is generated coexist in a fault current that flows between an inverter and a motor, insulation of coils of the motor, a motor cut-off contactor, and cables connecting the motor cut-off contactor to the motor is not broken down and the motor cut-off contactor is not damaged by an arc between contacts of the motor cut-off contactor, regardless of the type of a fault occurred. The present invention is particularly suitable when an AC motor incorporated in an electric vehicle is a permanent magnet synchronous motor.

The invention claimed is:

1. A driving controller for an AC motor comprising:
   an inverter that includes a plurality of on-off controlled switching elements and converts a DC voltage into an AC voltage with an arbitrary frequency to drive an AC motor;
   a motor side switch connected between the inverter and the AC motor;
   a current detector that detects an output current of the inverter; and
   a control unit that on-off controls the switching elements in the inverter and controls the motor side switch to open and close based on at least a current detected by the current detector, wherein
   the control unit comprises:
   a current-state determining unit that generates a determination signal indicating whether the current detected by the current detector is in an abnormal state, and
   a contactor control unit configured to appropriately control a timing of opening the motor side switch based on the determination signal.

2. The driving controller for an AC motor according to claim 1, wherein the control unit includes a gate-signal logic unit that generates a gate signal not only on-off controlling but also off-controlling the switching elements based on the determination signal.

3. The driving controller for an AC motor according to claim 1, wherein the current-state determining unit compares at least one of an index relating to an existence of zero-cross of the detected current, an index relating to a peak value of the detected current, and an index relating to an effective value of the detected current to a corresponding set value, and generates the determination signal based on the comparison result.

4. The driving controller for an AC motor according to claim 1, wherein the current-state determining unit determines that a current is in an abnormal state and generates the determination signal indicating a current abnormality, when an index relating to an existence of zero-cross of any one of the detected three-phase currents exceeds a first set value because zero-cross does not exist, when an index relating to a peak value of the detected current exceeds a second set value, or when an index relating to an effective value of the detected current exceeds a third set value.

5. The driving controller for an AC motor according to claim 1, wherein the current-state determining unit determines that a current is in a normal state and generates the determination signal indicating a normal state of the current, when an index relating to an existence of zero-cross in all the detected three-phase currents is lower than a first set value because a zero-point exists, an index relating to a peak value of the detected current is less than a second set value, and an index relating to an effective value of the detected current is less than a third set value.

6. The driving controller for an AC motor according to claim 1, wherein the contactor control unit does not control to open the motor side switch at a time when the current-state determining unit determines that the detected current is in an abnormal state.

7. The driving controller of an AC motor according to claim 1, wherein the contactor control unit controls to delay a timing of opening the motor side switch from a point of time when the current-state determining unit determines that the detected current is in an abnormal state until when the state is shifted to a state where it is suitable to open the motor side switch or when it is estimated that the shifting has been made.

8. The driving controller of an AC motor according to claim 1, wherein the electric-quantity detector is provided in a circuit that is provided between the inverter and the motor side switch.

9. A driving controller for an AC motor comprising:
   an inverter that includes a plurality of on-off controlled switching elements and converts a DC voltage into an AC voltage with an arbitrary frequency to drive an AC motor;
   a motor side switch connected between the inverter and the AC motor;
   an electric-quantity detector that detects an electric quantity at an output side of the inverter;
   a control unit that on-off controls the switching elements in the inverter and controls the motor side switch to open and close based on at least a current detected by the electric-quantity detector; and
   a discharging circuit connected in parallel to a capacitor provided between a positive side conductor and a negative side conductor of the inverter, to which the DC voltage is applied, wherein
   the control unit comprises:
   a current-state determining unit that generates a determination signal indicating whether the current detected by the electric-quantity detector is in an abnormal state, and
   a contactor control unit that controls, based on the determination signal, a timing of actually outputting an upper instruction, which has been generated for opening the motor side switch, to the motor side switch, and
   the discharging circuit is controlled to discharge electric charges of the capacitor before the motor side switch is opened.

10. The driving controller for an AC motor according to claim 9, wherein the control unit includes a gate-signal logic unit that generates a gate signal not only on-off controlling but also off-controlling the switching elements based on the determination signal.

11. The driving controller for an AC motor according to claim 9, wherein the current-state determining unit compares at least one of an index relating to an existence of zero-cross of the detected current, an index relating to a peak value of the detected current, and an index relating to an effective value of the detected current to a corresponding set value, and generates the determination signal based on the comparison result.

12. The driving controller for an AC motor according to claim 9, wherein the current-state determining unit determines that a current is in an abnormal state and generates the determination signal indicating a current abnormality, when an index relating to an existence of zero-cross of any one of the detected three-phase currents exceeds a first set value because zero-cross does not exist, when an index relating to a peak value of the detected current exceeds a second set value, or when an index relating to an effective value of the detected current exceeds a third set value.

13. The driving controller for an AC motor according to claim 9, wherein the current-state determining unit determines that a current is in a normal state and generates the determination signal indicating a normal state of the current, when an index relating to an existence of zero-cross in all the detected three-phase currents is lower than a first set value because a zero-point exists, an index relating to a peak value of the detected current is less than a second set value, and an index relating to an effective value of the detected current is less than a third set value.

14. The driving controller for an AC motor according to claim 9, wherein the contactor control unit does not control to open the motor side switch at a time when the current-state determining unit determines that the detected current is in an abnormal state.

15. The driving controller of an AC motor according to claim 9, wherein the contactor control unit controls to delay a timing of opening the motor side switch from a point of time when the current-state determining unit determines that the detected current is in an abnormal state until when the state is shifted to a state where it is suitable to open the motor side switch or when it is estimated that the shifting has been made.

16. The driving controller of an AC motor according to claim 9, wherein the electric-quantity detector is provided in a circuit that is provided between the inverter and the motor side switch.

17. A driving controller for an AC motor comprising:
an inverter that includes a plurality of on-off controlled switching elements and converts a DC voltage into an AC voltage with an arbitrary frequency to drive an AC motor;
a motor side switch connected between the inverter and the AC motor;
an electric-quantity detector that detects an electric quantity at an output side of the inverter; and
a control unit that on-off controls the switching elements in the inverter and controls the motor side switch to open and close based on at least a current detected by the electric-quantity detector, wherein
the control unit comprises:
a current-state determining unit that generates a determination signal indicating whether the current detected by the electric-quantity detector is in an abnormal state, and
a contactor control unit that controls, based on the determination signal, a timing of actually outputting an upper instruction, which has been generated for opening the motor side switch, to the motor side switch, and
the current-state determining unit determines that a current is in an abnormal state and generates the determination signal indicating a current abnormality, when an index relating to an existence of zero-cross of any one of the detected three-phase currents exceeds a first set value because zero-cross does not exist, when an index relating to a peak value of the detected current exceeds a second set value, or when an index relating to an effective value of the detected current exceeds a third set value.

18. A driving controller for an AC motor comprising:
an inverter that includes a plurality of on-off controlled switching elements and converts a DC voltage into an AC voltage with an arbitrary frequency to drive an AC motor;
a motor side switch connected between the inverter and the AC motor;
an electric-quantity detector that detects an electric quantity of an output side of the inverter; and
a control unit that on-off controls the switching elements in the inverter and controls the motor side switch to open and close based on at least a current detected by the electric-quantity detector, wherein
the control unit comprises:
a current-state determining unit that generates a determination signal indicating whether the current detected by the electric-quantity detector is in an abnormal state; and
a contactor control unit that controls, based on the determination signal, a timing of actually outputting an upper instruction, which has been generated for opening the motor side switch, to the motor side switch, and
the current-state determining unit determines that a current is in a normal state and generates the determination signal indicating a normal state of the current, when an index relating to an existence of zero-cross in all the detected three-phase currents is lower than a first set value because a zero-point exists, an index relating to a peak value of the detected current is less than a second set value, and an index relating to an effective value of the detected current is less than a third set value.

19. A driving controller for an AC motor comprising:
an inverter that includes a plurality of on-off controlled switching elements and converts a DC voltage into an AC voltage with an arbitrary frequency to drive an AC motor;
a motor side switch connected between the inverter and the AC motor;
an electric-quantity detector that detects an electric quantity of an output side of the inverter; and
a control unit that on-off controls the switching elements in the inverter and controls the motor side switch open and close based on at least a current detected by the electric-quantity detector, wherein
the control unit comprises:
a current-state determining unit that generates a determination signal that indicates whether the current detected by the electric-quantity detector is in an abnormal state; and
a contactor control unit that controls, based on the determination signal, a timing of actually outputting an upper instruction, which has been generated for opening the motor side switch, to the motor side switch, and
the contactor control unit does not control to open the motor side switch at a time when the current-state determining unit determines that the detected current is in an abnormal state.

20. A driving controller for an AC motor comprising:

an inverter that includes a plurality of on-off controlled switching elements and converts a DC voltage into an AC voltage with an arbitrary frequency to drive an AC motor;

a motor side switch connected between the inverter and the AC motor;

an electric-quantity detector that detects an electric quantity of an output side of the inverter; and a control unit that on-off controls the switching elements in the inverter and controls the motor side switch to open and close based on at least a current detected by the electric-quantity detector, wherein the control unit comprises:

a current-state determining unit that generates a determination signal indicating whether the current detected by the electric-quantity detector is in an abnormal state; and a contactor control unit that controls, based on the determination signal, a timing of actually outputting an upper instruction, which has been generated for opening the motor side switch, to the motor side switch, and the contactor control unit controls to delay a timing of opening the motor side switch from a point of time when the current-state determining unit determines that the detected current is in the abnormal state until when the state is shifted to a state where it is suitable to open the motor side switch or when it is estimated that the shifting has been made.

* * * * *